United States Patent [19]
Harig

[11] 3,899,227
[45] Aug. 12, 1975

[54] METAL LINING

[75] Inventor: Friedrich Harig, Willich, Germany

[73] Assignee: Firma Pampus KG, Willich, Germany

[22] Filed: Jan. 16, 1973

[21] Appl. No.: 324,184

[30] Foreign Application Priority Data
Feb. 3, 1972 Germany............................ 2205008

[52] U.S. Cl......................... 308/237 R; 29/149.5 R
[51] Int. Cl. ............................................ F16c 33/28
[58] Field of Search ... 245/8; 308/237, 239, DIG. 5, 308/DIG. 8; 29/163.5 F, 149.5 R; 161/88, 89

[56] References Cited
UNITED STATES PATENTS

| | | | |
|---|---|---|---|
| 2,212,473 | 8/1940 | Hessenbruch et al............ | 308/237 R |
| 2,357,106 | 8/1944 | Grenot................................. | 308/237 |
| 2,976,093 | 3/1961 | Reiling................................ | 308/238 |
| 3,140,973 | 7/1964 | Johnson................................... | 245/8 |
| 3,428,278 | 2/1969 | Glaze........................................ | 245/8 |
| 3,452,556 | 7/1969 | Einhorn.............................. | 308/238 |

Primary Examiner—Richard J. Herbst
Attorney, Agent, or Firm—Ernest F. Marmorek

[57] ABSTRACT

A lining, especially for bearing bushings, has a metal fabric, preferably including bronze, coated by a sintered plastics, such as polymeric fluoride. The intersection points of respective wires of the fabric are thermally bonded together and subsequently calendered.

5 Claims, 4 Drawing Figures

METAL LINING

BACKGROUND OF THE INVENTION

This invention relates generally to metal linings and more particularly to a metal lining comprising a metal fabric including bronze for example and upon which a polymeric fluoride is pressed in layers and sintered. The metal linings of this type have been since many years employed especially for lining bearing bushings and bearing boxes.

In manufacturing metal linings of this type a difficulty has been encountered resulting from the loosening of individual wires in the metal fabric during the punching or cutting of the lining. The loosening of the wires of the metal fabric during the machining disturbs or even impedes the automatic feeding into processing machines since the projecting wires of adjacent parts frequently get hooked with each other. Moreover, when the loose metal wires or fibres reach together with a completed product the interior of a bearing, the bearing surface may become damaged and in addition there is a danger of rendering the entire bearing in a very short time unusable.

For the above reasons experiments have been made to replace the metal fabric for a perforated metal sheet. Nonetheless, as the undercuts in metal sheets can be made in a very limited extent only, the physical bond of plastics on the metal reinforcement is insufficient.

Accordingly, an object of this invention is to avoid the disadvantages of prior art metal linings.

More specifically, an object of this invention is to provide a bound fabric of metal wires serving as supporting structures of the metal lining and maintaining all advantages thereof and to impart to such lining qualities of a metal sheet thereby avoiding the inherent disadvantages of metal fabrics.

SUMMARY OF THE INVENTION

According to this invention, the above objects are attained by providing a metal fabric wherein the intersecting points of respective wires of the fabric are bonded thermally together.

In a further development of this invention, the metal sheet like quality of the resulting metal fabric can be still reinforced by a subsequent calendering or rolling.

The result of the fabric according to this invention both with plastic layers or without such layers makes it possible to perform cuts or punchings without loosening the individual wires. Moreover, in processing completed linings it was found that the shaping of the lining is substantially easier than that in prior art linings. The fact that the lining according to this invention practically does not spring-back during deep drawing or shaping for example permits substantially greater tolerances than it has been hitherto possible. The shaping can be carried out in conventional metal sheet bending machines. In addition, the resistance against pressure of the lining of this invention is also considerably increased because the individual wires which are bonded or welded together at intersecting points can no longer turn aside or get shifted when subjected to a load. The completed lining according to this invention has an almost uniform pressure distribution over its entire surface in contrast to conventional linings which were loaded in a plurality of points only.

It is advantageous to employ a fabric made of bronze. The employment of a lead bronze is recommended as the sintered coating of plastic can especially well adhere to the latter material.

BRIEF DESCRIPTION OF THE DRAWINGS

For a better understanding of this invention reference is had to the accompanying drawings in which.

DETAILED DESCRIPTION

Figure 1:
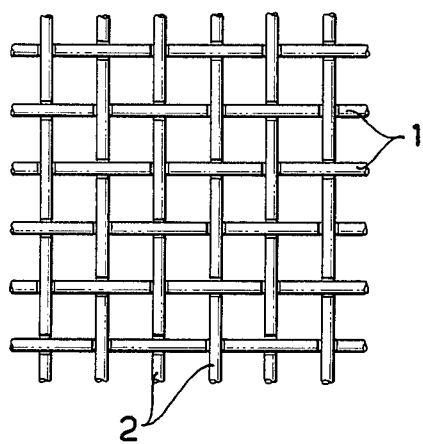
FIG. 1 is a plane view of a metal fabric as employed in the lining of this invention.
Figure 2:
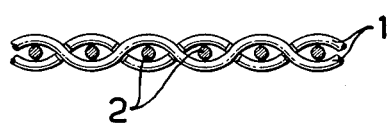
FIG. 2 is a sectional side view of the fabric of FIG. 1 prior to the thermal treatment thereof.

As seen from FIGS. 1 and 2, the starting supporting structure of the lining of this invention is a conventional metal fabric comprising longitudinal wires or fibres 1 interwoven with transverse wires or fibres 2. At this stage, the intersecting points of respective wires have no positive bond between each other. According to this invention, these intersection points are subject to thermal treatment until the intersecting wires are bonded or welded together as shown in FIG. 3.

In the preferred embodiment of this invention, a polymeric material such as a polymeric fluoride is pressed onto the bonded or welded metal fabric and sintered to form a plastic layer 3 thereon. Sintering results in the plastic layer 3 enveloping the metal fabric as well as adhering directly to it.

Figure 3:
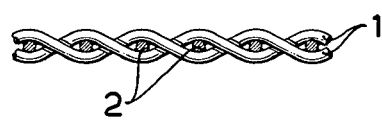
FIG. 3 is a sectional side view of the metal fabric upon the thermal treatment.
Figure 4:
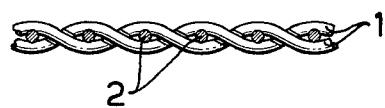
FIG. 4 is a sectional side view of the metal fabric after its calendering or rolling.

In an additional stage, the thermally bonded metal fabric of FIG. 3 is subject to calendering or rolling so that the resulting metal lining is flattened and a metal sheet like quality thereof is still increased.

I wish it to be understood that I do not desire to be limited to the exact details of construction shown and described, for obvious modifications will occur to a person skilled in the art.

Having thus described my invention, what I claim as new and desire to be secured by Letters Patent, is as follows:

1. In a lining, for use in bearing bushings, having a woven fabric of metal wires and a synthetic plastic layer sintered thereon,
   the improvement comprising
   at least a portion of at least some of the intersecting areas of said wires having been welded together and
   the fabric having been flattened by rolling after the welding.

2. A lining, for use in bearing bushings, comprising a flat rolled metal wire fabric having intersections at least some of which are welded together, and a synthetic plastic layer sintered thereon.

3. A lining according to claim 1, wherein said plastic layer is composed of polymeric fluoride.

4. A lining according to claim 1, wherein the metal of the wires of said fabric includes bronze.

5. A lining according to claim 1, wherein the wires of said fabric are composed of lead bronze.

* * * * *